(12) United States Patent
Bain et al.

(10) Patent No.: US 8,289,659 B1
(45) Date of Patent: *Oct. 16, 2012

(54) SYSTEMS AND METHODS FOR MAGNETIC HEAD ELEMENT TRANSLATION

(75) Inventors: James A. Bain, Pittsburgh, PA (US); William C. Messner, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/718,674

(22) Filed: Mar. 5, 2010

(51) Int. Cl.
*G11B 5/596* (2006.01)

(52) U.S. Cl. .......... 360/294.3; 360/125.31; 360/125.74; 360/294.7

(58) Field of Classification Search .............. 360/294.7, 360/294.3, 125.31, 125.74
See application file for complete search history.

(56) References Cited

U.S. PATENT DOCUMENTS

| | | | |
|---|---|---|---|
| 5,991,113 A | | 11/1999 | Meyer et al. |
| 6,362,542 B1 * | | 3/2002 | Novotny ............... 310/12.03 |
| 6,594,119 B1 * | | 7/2003 | Koshikawa et al. ....... 360/294.3 |
| 6,600,634 B1 * | | 7/2003 | Kim et al. .................. 360/294.5 |
| 6,859,346 B1 * | | 2/2005 | Meyer ........................ 360/294.7 |
| 7,130,160 B2 | | 10/2006 | Kwon et al. |
| 7,400,473 B1 * | | 7/2008 | Krajnovich et al. ....... 360/294.7 |
| 7,502,205 B1 | | 3/2009 | Hurtado et al. |
| 8,045,286 B2 * | | 10/2011 | Morikawa ............... 360/125.74 |
| 2005/0213250 A1 * | | 9/2005 | Kurita et al. .............. 360/234.4 |
| 2006/0187583 A1 * | | 8/2006 | Lou et al. ...................... 360/128 |
| 2007/0109687 A1 * | | 5/2007 | Morikawa .................. 360/246.2 |
| 2007/0115583 A1 | | 5/2007 | Bonhote et al. |
| 2007/0297080 A1 | | 12/2007 | Lee |
| 2008/0130175 A1 | | 6/2008 | Jeong et al. |
| 2008/0239571 A1 * | | 10/2008 | Juang et al. ................ 360/234.3 |
| 2009/0034128 A1 | | 2/2009 | Sharma et al. |
| 2009/0190245 A1 | | 7/2009 | Nakata |
| 2009/0225461 A1 | | 9/2009 | Aoki |

OTHER PUBLICATIONS

Shiramatsu et al., "Dynamically Controlled Thermal Flying-Height Control Slider", IEEE Transactions on Magnetics, vol. 44, No. 11, Nov. 2008, pp. 3695-3697.

* cited by examiner

*Primary Examiner* — Craig A. Renner
(74) *Attorney, Agent, or Firm* — K&L Gates LLP

(57) ABSTRACT

Systems and methods for controlling the position of a magnetic head element and/or the magnetic head element to media spacing in a data storage device. At least one microactuator is embedded in a hard disk drive slider laterally displaced from the magnetic head element. Activation of the microactuator translates the magnetic head element in a lateral direction.

8 Claims, 13 Drawing Sheets

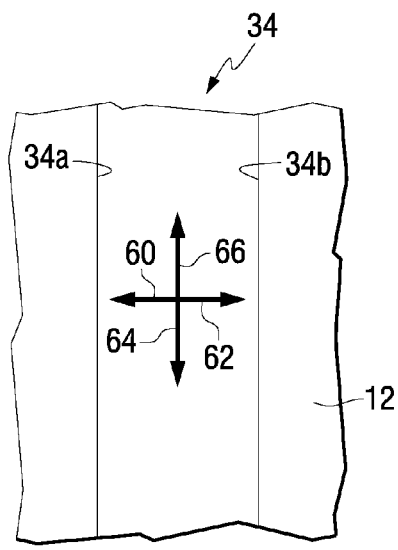
FIG. 5
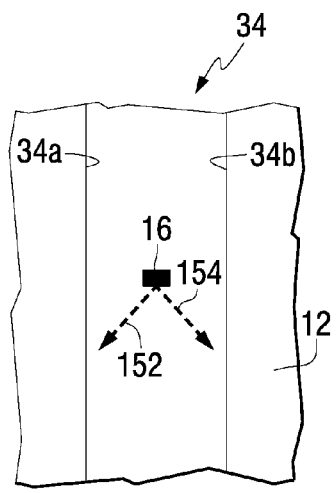 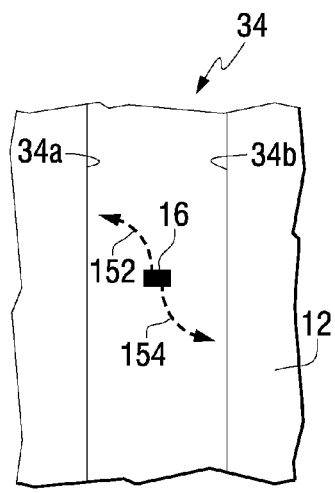 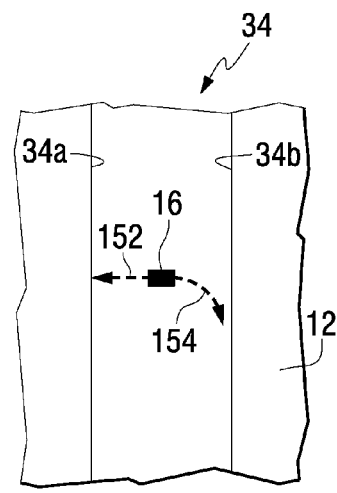
FIG. 6A  FIG. 6B  FIG. 6C

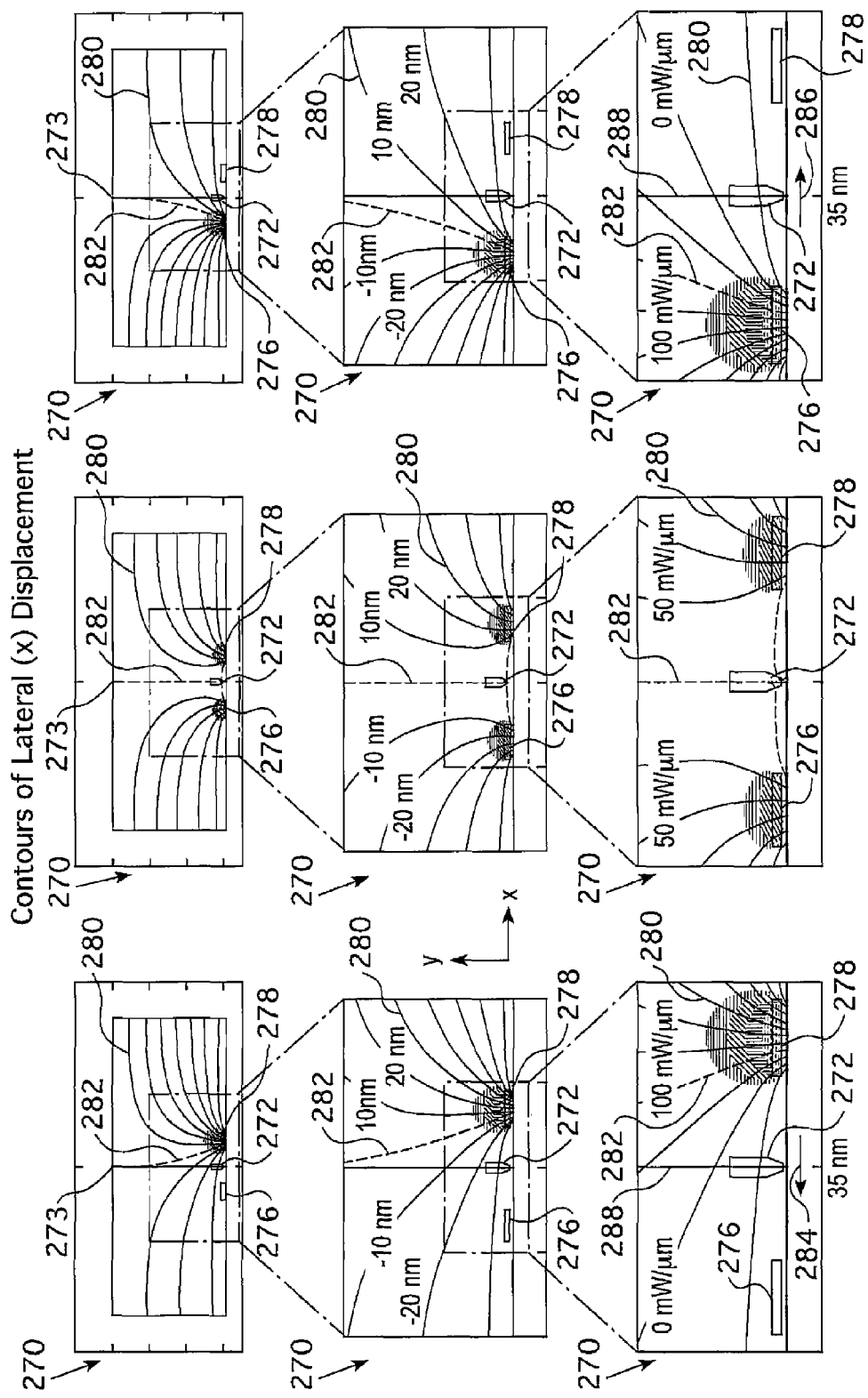

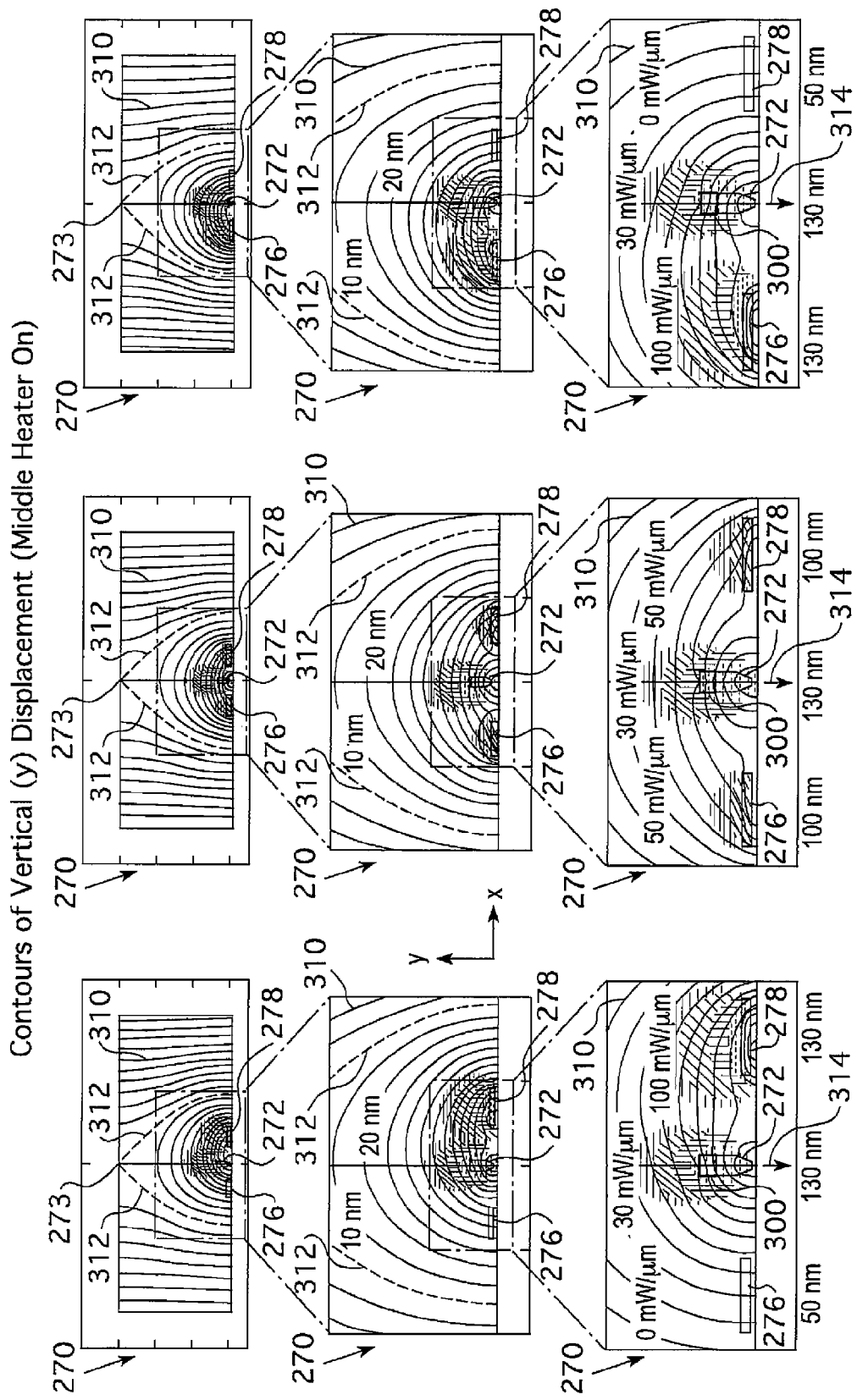

SYSTEMS AND METHODS FOR MAGNETIC HEAD ELEMENT TRANSLATION

BACKGROUND

Modern hard disk drives may have one or more rotating disks. Each disk may have two disk surfaces in use. Hard disk drives also include a servo controller that drives a voice coil actuator to position a read-write head near a track on the surface of a rotating disk in order to read and/or write data to the track. The read-write head may be a magnetic transducer adapted to read data from and/or write data to the one or more rotating disks. Read operations are generally accomplished by sensing a magnetic field associated with the surface of the disk. Write operations are generally accomplished by selectively magnetizing the surface of the disk. The read-write head communicates with the servo controller, providing feedback, which is used in controlling the read-write head's positioning relative to the track. The read-write head is embedded in a slider, which flies on a thin layer of air, known as an air bearing, a very short distance above the rotating disk surface.

The trend in the hard disk drive industry is to increase the areal density of the rotating disk surfaces. This is usually achieved by decreasing the width of the tracks and reducing the flying height of the read-write head above the rotating disk surface, thus reducing the air bearing. Currently read-write heads fly at about 10 nanometers (nm) from the rotating disk surfaces.

SUMMARY

In one general aspect, the present invention is directed to systems and methods for adjusting the placement of a magnetic head element in relation to a track of a rotating magnetic storage disk in a hard disk drive. In one embodiment, the system comprises a slider comprising a vertical axis and a horizontal axis, wherein the slider comprises a magnetic head element, a first microactuator, and a second microactuator. The first microactuator is positioned relative to the magnetic head element such that the magnetic head element is translated generally along the horizontal axis in a first direction when the first microactuator is activated. Thus, the magnetic head element is able to laterally translate relative to the track in order to follow the track as the magnetic storage disk rotates.

In another general aspect, the present invention is directed to a method that comprises the steps of: rotating a disk of a data storage device; moving a magnetic head element with a voice coil to a location proximate to a track on the disk; activating a first lateral heater coupled to the slider; laterally translating the magnetic head element in a first lateral direction; activating a second lateral heater coupled to the slider; and laterally translating the magnetic head element in a second lateral direction. In one embodiment, the method comprises compensating for the vertical displacement of the slider imparted by at least one of the first lateral heater and the second lateral heater. A central heater may be deactivated to compensate for the vertical displacement of the slider imparted by at least one of the first lateral heater and the second lateral heater.

FIGURES

Various embodiments are described herein by way of example in conjunction with the following figures, wherein:

FIG. 5 is a top view of a portion of an HDD illustrating a portion of a concentric track in accordance with one non-limiting embodiment;

FIGS. 6A-6C are top views of a track portion of an HDD illustrating lateral movements of a magnetic head element in accordance with various non-limiting embodiments;

FIGS. 10A-10C are each successive close-ups of the lateral mechanical displacements in a two-dimensional simulated slider using Finite Element Analysis (FEA) when a first lateral heater and/or a second lateral heater are activated;

FIGS. 13A-13C are each successive close-ups of the vertical mechanical displacements in a two-dimensional simulated slider using FEA when a central heater, a first lateral heater and/or a second lateral heater are activated;

DESCRIPTION

According to various embodiments, in order to control the cross track position of a magnetic head element and/or control the magnetic head element-to-media spacing in a data storage device, one or more laterally located electrothermal actuators (e.g., microactuators) are embedded in a hard disk drive slider. The electrothermal actuators are laterally displaced from the magnetic head element. In some embodiments, an electrothermal actuator may be placed on each side of the magnetic head and a third central electrothermal actuator may be located directly above the magnetic head element. As discussed in more detail below, operating the central electrothermal actuator controls the vertical position along a vertical axis of the slider (e.g., the magnetic head-element-to-media spacing) and operating the lateral actuators thermally expands the slider to laterally translate (i.e. shift) the magnetic head element along a horizontal axis of the slider. In one embodiment, the lateral electrothermal actuators are operated in a differential mode to create a temperature gradient in the slider that moves the magnetic head element horizontally to control the cross track position. In various embodiments, the lateral electrothermal actuators are located at a distance far enough from the magnetic head element that their expansion of the slider material has a negligible effect, if any at all, on the magnetic head element-to-media spacing (i.e., fly height). In other embodiments, the expansion of portions of the slider caused by activation of the laterally located electrothermal actuators is used to effect the magnetic head element-to-media spacing. Thus, through the use of electrothermal actuators to translate horizontally the magnetic head element during operation of the data storage device, the bandwidth of the servo system of the disk drive is increased. Furthermore, as the electrothermal actuators may be monolithically integrated into the slider, the stiffness of the slider is maintained.

It is to be understood that the figures and descriptions of the following embodiments have been simplified to illustrate elements that are relevant for a clear understanding of the present disclosure, while eliminating, for purposes of clarity, other elements. Those of ordinary skill in the art will recognize that the various elements not illustrated or described are well known in the art, and because they do not facilitate a better understanding of the present invention, a discussion of such elements is not provided herein. It will be further appreciated that for conciseness and clarity, spatial terms such as "vertical," "horizontal," "up," and "down" may be used herein with respect to the drawings. However, the embodiments disclosed herein may be used in many orientations and positions, and these terms are not intended to be limiting and absolute. In addition, the figures are not necessarily drawn to precise scale.

Figure 1:
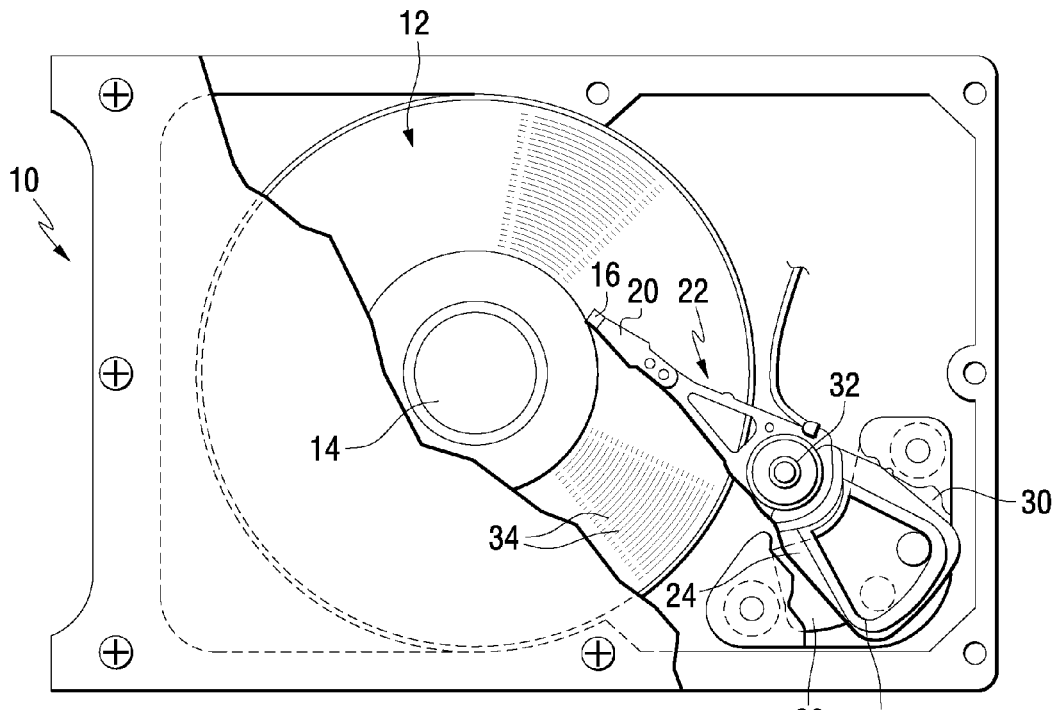
FIG. 1 is a plan view of a hard disk drive (HDD) according to one non-limiting embodiment.

FIG. 1 is a plan view of an hard disk drive (HDD) 10 according to one non-limiting embodiment. The HDD 10 includes at least one magnetic disk 12 rotated by a spindle motor 14. The HDD 10 also includes at least one magnetic head element 16 adapted to move above the recording surface of the disk 12. The magnetic head element 16 may read data from and/or write data to the rotating disk 12 by sensing a magnetic field on the surface of the disk 12 or magnetizing the surface of disk 12. Though a single magnetic head element 16 is shown in FIG. 1, it may include both a write head for magnetizing disk 12 and a separate read head for sensing a magnetic field associated with disk 12. In one embodiment, the magnetic head element may be a magneto-resistive (MR) component.

The magnetic head element 16 is mounted on a slider 20, which may be a three-dimensional body. The slider 20 generates an air bearing between the magnetic head element 16 and the surface of the disk 12 as the disk 12 rotates. The slider 20 is combined with a head gimbal assembly (HGA) 22. The HGA 22 is attached to an actuator arm 24 having a voice coil 26. The voice coil 26 is located adjacent to a magnetic assembly 28 to define a voice coil motor (VCM) 30. Drive current supplied to the voice coil 26 generates a mechanical torque that rotates the actuator arm 24 around a bearing assembly 32. The rotation of the actuator arm 24 moves the magnetic head element 16 over the surface of the disk 12.

Data is typically stored in concentric tracks 34 around the disk 12. In general, each track 34 includes a plurality of sectors. Each sector typically includes a data field and an identification field. The identification field may be composed of gray code identifying sectors and tracks (cylinders). The magnetic head element 16 moves over the surface of the disk 12 to read or write data from a designated track. Using the identification field, information can be provided to a controller 42 (FIG. 2) to determine the magnetic head element's position relative to the track. Using the systems and methods described herein, the magnetic head element may be translated laterally, often at extremely small distances, in order to properly follow the track.

Figure 2:
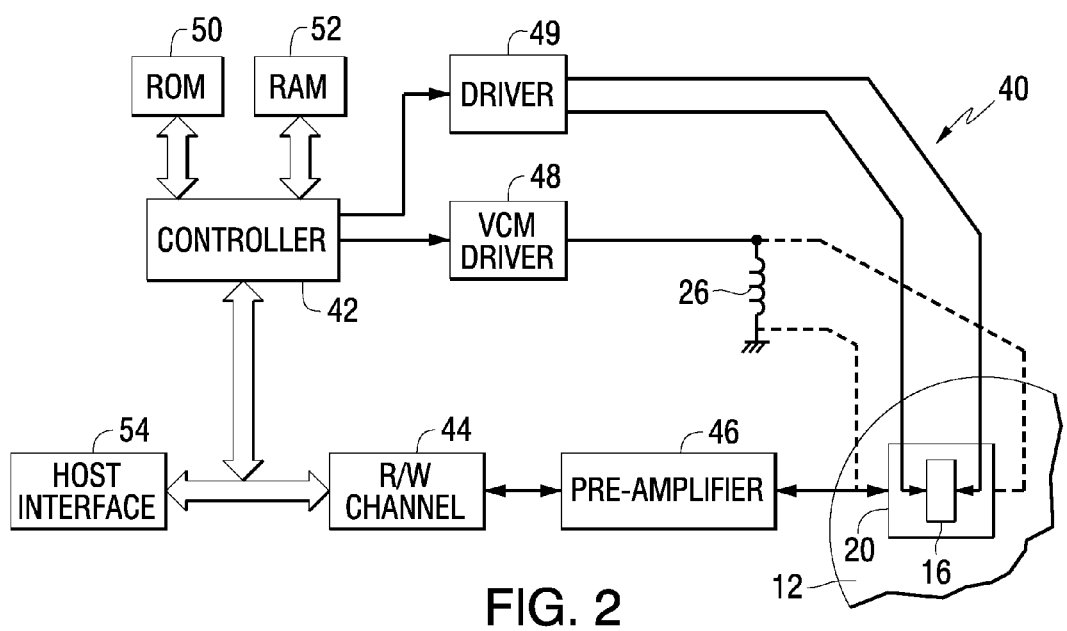
FIG. 2 is a block diagram of an electrical system associated with an HDD in accordance with one non-limiting embodiment.

FIG. 2 is a block diagram of an electrical system associated with the HDD 10 in accordance with one non-limiting embodiment. The electrical system 40 controls the operation of the HDD 10 and includes a controller 42 connected to the magnetic head element 16 through a read/write (R/W) channel circuit 44 and a pre-amplifier 46. The controller 42 may be implemented using any suitable technique, such as a conventional digital signal processor (DSP), a microprocessor, or a micro-controller, for example. The controller 42 provides a control signal to a R/W channel circuit 44 during read/write operations. Data is typically communicated from the R/W channel circuit 44 to a host interface circuit 54. The host interface circuit 54 includes a buffer memory (not shown) available to the HDD 10 and an associated control circuit (not shown) interfacing with a host device, such as a server, personal computer (PC), an MP3 player, or other electronic devices.

The controller 42 is also connected to a VCM driver 48 supplying a driving current to the voice coil 26. The controller 42 provides a control signal to a VCM driver 48 to control the excitation of the VCM 30 and the movement of the magnetic head element 16. The controller 42 is also connected to a driver 49 supplying a drive current to microactuators (see, e.g. FIG. 4) coupled to the slider 20 to control the fine lateral movement of the magnetic head element 16 in the slider 20. In one embodiment, the VCM driver 48 is utilized for "track seek" operations (e.g., moving from a track to different track) and the driver 49 is utilized for "track follow" operations (e.g., lateral movement within a track). The controller 42 is also connected to a nonvolatile memory, such as a read only memory (ROM) 50 or a flash memory, for example, and a random access memory (RAM) 52. The memories 50 and/or 52 are adapted to store instructions and data, which may be used by the controller 42 to execute software routines. For example, one software routine might define and control a seek routine moving the magnetic head element 16 from one track to another and another software routine might define and control a track follow routine for the magnetic head element 16.

Figure 3A:
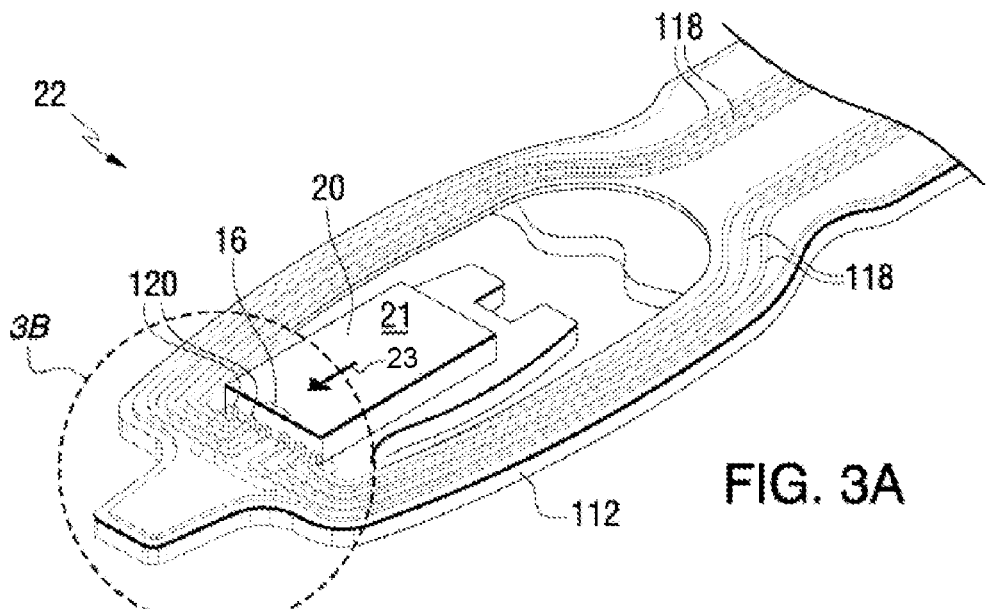
FIGS. 3A-3B are perspective views of a head gimbal assembly, with FIG. 3B providing an enlarged view of portion 3B of FIG. 3A.
Figure 3B:
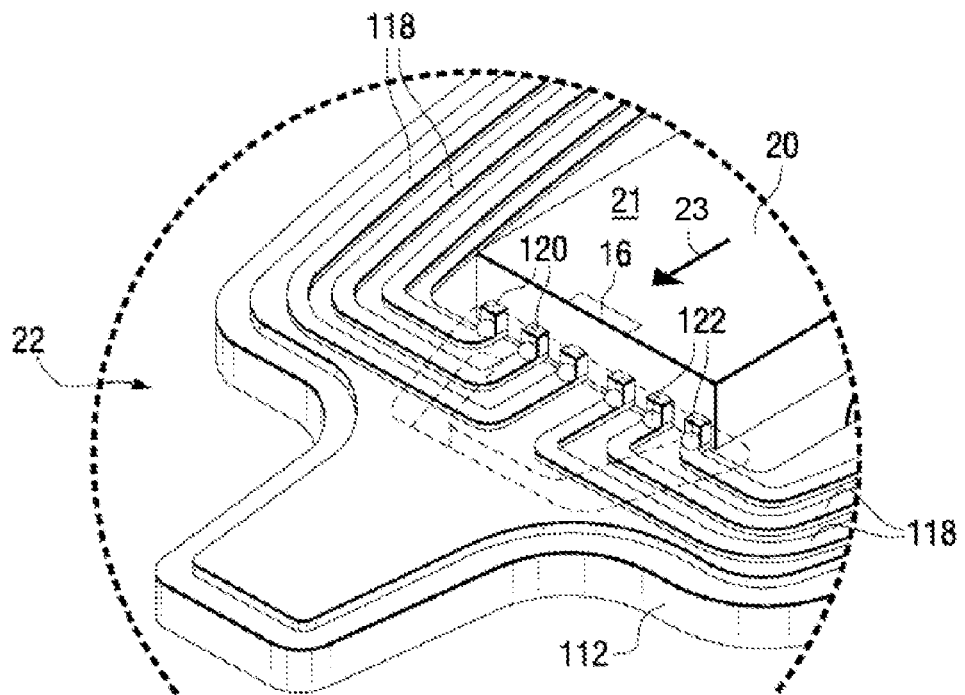

FIG. 3A is a perspective view of the HGA 22 illustrated in FIG. 1, and FIG. 3B is an enlarged view of portion 3B of FIG. 3A, in accordance with one non-limiting embodiment. Referring to FIGS. 3A and 3B, an HGA 22 of the HDD 10 includes the flexure 112, the slider 20, and the magnetic head element 16. The slider 20 is attached to and supported by the flexure 112. The magnetic head element 16 is disposed in the slider 20. As discussed in more detail below, the slider 20 may comprise at least one microactuator (not shown) for laterally translating the magnetic head element 16. When the disk 12 rotates, the slider 20 receives an airflow, indicated by arrow 23, at a bottom surface 21. When the slider 20 flies above the surface of the magnetic disk 12, the slider 20 can be kept at an inclined attitude defined by a pitch angle. Here, the term "pitch angle" is used to define an inclined angle in the longitudinal direction of the slider 20 along the direction of the airflow. A plurality of traces 118 are provided on the flexure 112 and are electrically connected to the magnetic head element 16. In the illustrated embodiment, a plurality of pads 120 are provided at a side of the slider 20. The traces 118 may be bonded to the pads 120 through solder balls 122 so as to be electrically connected to the pads 120. The traces 118 may correspond, for example, to two read signals R+ and R−, two write signals W+ and W−, and control signals for the microactuators.

According to various embodiments, the vertical positioning of the magnetic head element 16 relative to the magnetic disk 12 may be adjusted. In one embodiment, thermal expansion of portions of the slider 20 through an application of heat thereto, reduces a gap between the magnetic head element 16 and the surface of the disk 12, thereby dynamically lowering or raising a flight height of the magnetic head element 16 relative to surface of the disk 12. Thus, two additional traces 118 corresponding to two signals for activating and deactivating microactuators and two additional pads 120 may be implemented to apply such a dynamic fly height technique.

Figure 4:
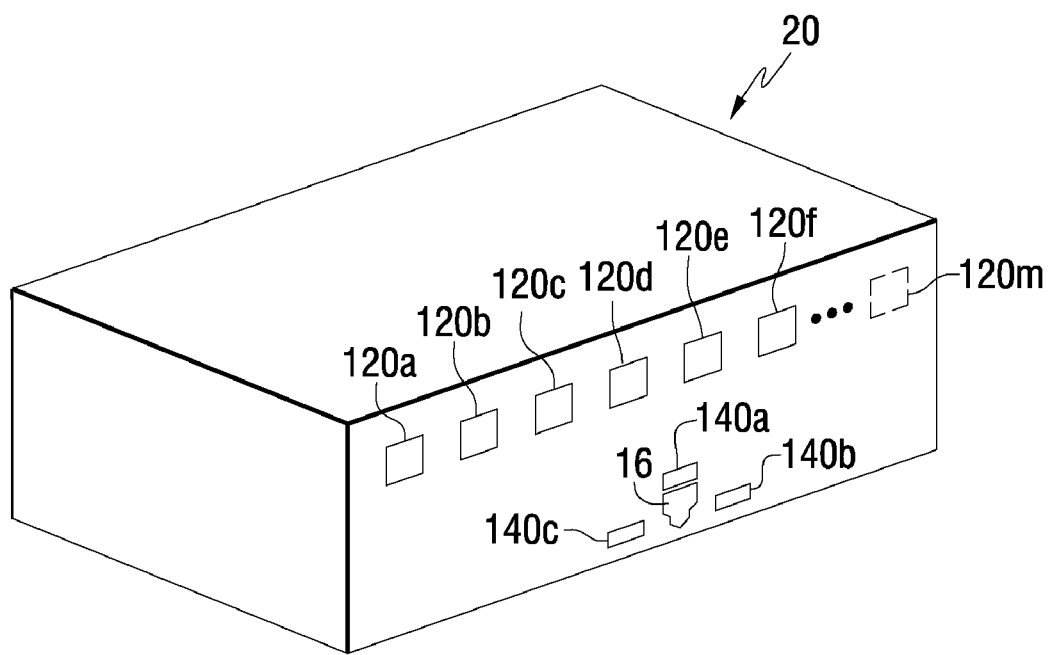
FIG. 4 is a perspective view of a slider in accordance with one non-limiting embodiment.

FIG. 4 is a perspective view of the slider 20 in accordance with one non-limiting embodiment. The slider 20 may be any suitable shape, such as a parallelepiped, for example. The slider may comprise suitable electrical connectors, such as pads 120m, where m is any positive integer, configured to receive an electrical connection (pads 120a, 120b, 120c, 120d, 120e, 120f, . . . 120m are shown in FIG. 4). The pads 120m may be connected to conductors (not shown) that interconnect the pads 120m to various components of the slider 20, such as the magnetic head element 16. As is to be appreciated, the magnetic head element may comprise a variety of magnetic transducers, such as a read head and a write head, or a combination read-write head, for example. A plurality of microactuators 140n, where n is any positive integer, are positioned in the slider 20 proximate to the magnetic head element 16. The microactuators 140n may be electrothermal actuators (i.e. "heaters"). When activated, the microactuators 140n heat and expand portions of the slider 20 to translate the magnetic head element 14 in relation to the tracks 34 around the disk 12 (FIG. 1). In one embodiment the microactuators 140n are comprised of piezoelectric ceramic materials, such as lead zirconate titanate (PZT), for example. The piezoelectric effect generates a mechanical action through the application of electric power to the microactuators 140n. Activation of the piezoelectric mechanical action creates a mechanical strain within portions of the slider 20 analogous to the thermal mechanical strain produced by the electrothermal actuators.

The microactuators 140n may be controlled by the controller 42 through one or two wires electrically connected to the microactuators 140n to create a control circuit. In the single wire approach, the servo-controller provides a DC (direct current) voltage to one of the two leads of a microactuator 140n. The other lead is tied to a shared ground. In the two wire approach, the servo-controller drives both leads of the microactuator 140n. Electrically stimulating the microactuators 140n through the wires (i.e., providing electrical current) triggers mechanical motion of the magnetic head element 16 due to thermal expansion of the slider 20 caused by the heat dissipated from the microactuators 140n. The microactuators 140n effectively add fine track-follow positioning capabilities to the voice coil actuator, which serves to extend the servo bandwidth.

Still referring to FIG. 4, when the slider 20 is in use, activation of the various microactuators 140n moves the magnetic head in relation to the disk 12 (not shown). Activation of the microactuator 140a, for example, the expands the slider 20 through the application of heat and thereby vertically moves the magnetic head element 16, such as while dynamically controlling the fly height. As is to be appreciated, during activation, the microactuators 140n may be supplied with a varying level of voltage and/or current to control the amount of mechanical motion (i.e., thermal expansion) induced in the slider 20. Thus, the amount of movement imparted onto the magnetic head element 16 may be varied based on need. Other microactuators 140n, such as microactuators 140b, 140c, that are in embedded, or otherwise coupled to, the slider 20 may also be independently activated or deactivated to varying levels to impart horizontal and/or vertical movement onto the magnetic head element 16. In the illustrated embodiment, the microactuators 140a, 140b are each laterally positioned on either side of the magnetic head element 16. As discussed in more detail below, the microactuators 140n may be positioned in a variety of orientations, and this disclosure is not limited to any particular orientation or configuration.

The controller 42 may independently supply voltage and/or current to microactuator 140a, 140b, 140c at the same, or different, levels of activation to manipulate the lateral and/or vertical position of magnetic head element 16. FIG. 5 is a top view of a portion of the disk 12 illustrating a portion of a concentric track 34. The concentric track has a first wall 34a and a second wall 34b. A first cross-track direction is indicated by arrow 60. Movement in the first cross-track direction 60 is towards the first wall 34a. A second cross-track direction is indicated by arrow 62. Movement in the second cross-track direction is towards the second wall 34b. A down-track direction is indicated by arrow 64 and an up-track direction is indicated by arrow 66. As used herein, the term "lateral" refers to any movement of the magnetic head element 16 that comprises a cross-track component (e.g., movement in direction 60 or 62). For example, in some embodiments, lateral movement of the magnetic head element 16 may include movement in both the first cross-track direction 60 and the down-track direction 64. In some embodiments, lateral movement of the magnetic head element 16 may include movement in both the second cross-track direction 62 and the up-track direction 66. Thus, lateral movement of the magnetic head element 16 includes all movement towards the first or second walls 34a, 34b, regardless of whether the movement is also generally perpendicular or oblique to the first or second walls 34a, 34b. For example, the magnetic head element 16 may move in a first lateral direction towards the first wall 34a that may be parallel or non-parallel to later movement of the magnetic head element 16 in a second lateral direction towards the second wall 34b.

As the disk 12 spins, the magnetic head element 16 sometimes needs to move laterally in order to follow the track 34. FIGS. 6A-6C are top views of a track portion of the disk 12 illustrating lateral movements of the magnetic head element 16 in accordance with various non-limiting embodiments. For the purposes of clarity, only the magnetic head element 16 is illustrated. Furthermore, as is to be appreciated, the magnetic head element 16 may be flying above the bottom surface of the track 34 while laterally moving towards the first or second side walls 34a, 34b. As shown in FIG. 6A, in one embodiment, the magnetic head element 16 may move in a first lateral direction 152 or a second lateral direction 154. As the magnetic head element 16 moves in the first or second lateral direction 152, 154, it also moves in the down-track direction 64. As shown in FIG. 6B, in one embodiment, the magnetic head element 16 may move in a first lateral direction 152 that comprises movement in the up-track direction 66 or a second lateral direction 154 that comprises movement in the down-track direction 64. As illustrated, the path of the magnetic head element 16 may be curved, straight, or comprise both curved and straight components. As shown in FIG. 6C, in one embodiment, the magnetic head element 16 may move in a first lateral direction 152 that is generally perpendicular to the first wall 34a. Alternatively, the magnetic head element 16 may move in a second lateral direction 154 that is non-symmetric to the first lateral direction 152.

Figure 7A:
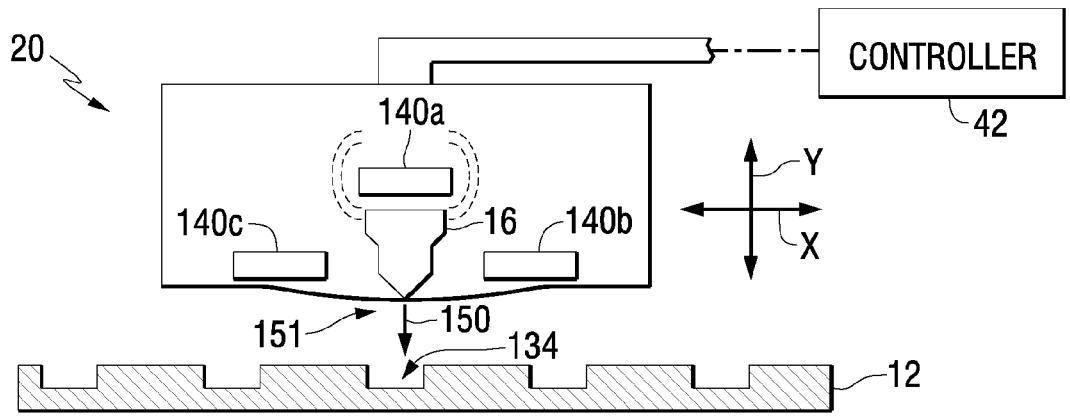
FIGS. 7A-7C illustrates the slider of FIG. 4 in various stages of operation.
Figure 7B:
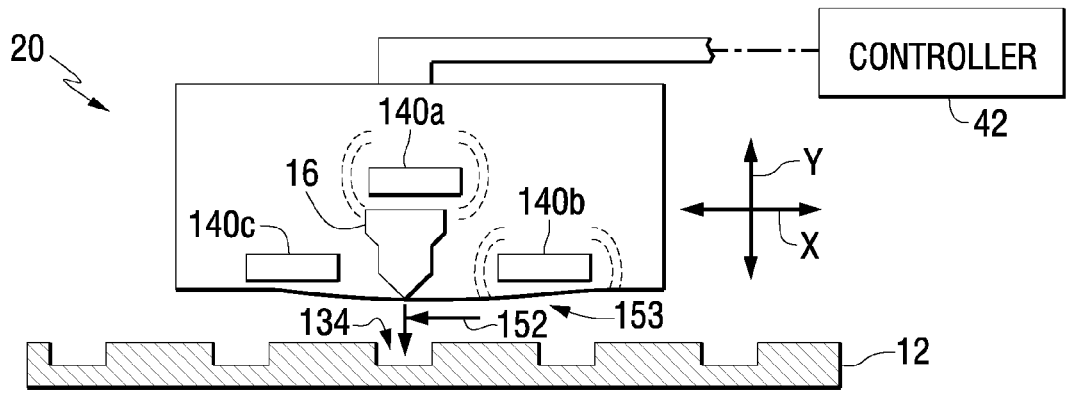
Figure 7C:
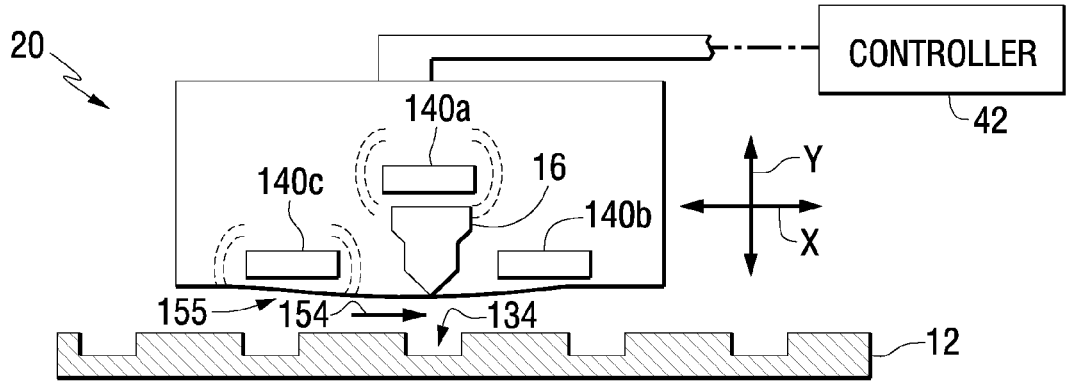

FIGS. 7A-7C are side views of the slider 20 in various stages of operation. In FIG. 7A, the microactuator 140a is activated and the magnetic head 16 is moved in a first direction 150 (i.e., vertically) towards a track 134 on the disk 12 due to the thermal expansion of the material 151 proximate to the microactuator 140a. The first direction 150 may be substantially parallel to a vertical axis of the slider 20 (illustrated as "Y").

As illustrated in FIG. 7B, in order to move the magnetic head element 16 in a first lateral direction 152, the microactuator 140b is activated to thermally expand the material 153 of the slider 20 proximate to the microactuator 140b. The first lateral direction 152 may be generally along a horizontal axis of the slider 20 (illustrated as "X"). As a result of the thermal expansion, the magnetic head element 16 is translated in the first lateral direction 152. The amount of translation of the magnetic head element 16 is controlled by the amount of energy delivered to the microactuator 140b. As is to be appreciated, a feedback loop may be used to determine the amount of translation needed in order to keep the magnetic head element 16 properly positioned within the track 134.

As illustrated in FIG. 7C, in order to move the magnetic head element 16 in a second lateral direction 154, the microactuator 140c may be activated by the controller 42. As the microactuator 140c heats the material 155 of the slider 20 proximate to the microactuator 140c, the magnetic head element 16 is laterally translated in the second lateral direction 154.

In various embodiments, the microactuators 140a, 140b, 140c may be simultaneously activated, with the same or different power levels. In one embodiment, a total amount of power delivered collectively to the microactuators 140n is relatively constant, and the amount of power delivered to individual microactuators 140n is varied by the controller 42 based on need. Furthermore, in various embodiments the voice coil 26 (FIG. 2) is used to move the slider to the proper track (i.e., track seek) and the microactuators 140b, 140c are used to maintain proper positioning of the magnetic head element 16 within the track as the magnetic head element is reading or writing information (i.e., track follow).

In various embodiments, while the movement of the magnetic head element in the first or second lateral directions may be generally along a horizontal axis of the slider, the laterally spaced microactuator(s) may also impart incidental vertical movement to the magnetic head element during activation due to the thermal expansion of the slider. It is noted that even if a lateral microactuator imparts movement in the vertical axis, the overall movement of the magnetic head element is still generally along the horizontal axis of the slider. As the slider is heated by a plurality of microactuators, such as microactuators 140a, 140c, the gap between the magnetic head element and the disk may be reduced due to the thermal expansion of the slider. Such a reduction in the fly height of the magnetic head element 16 may be undesired. In order to compensate for the additional vertical displacement, the energy delivered to the central microactuator may be decreased by the control circuit in order to maintain the magnetic head element at a proper fly height. With reference to FIG. 7C, for example, activation of microactuator 140c may not only laterally move the magnetic head element 16 by thermal expansion of the slider 20, but may also move the magnetic head element 16 in the first direction 150 (FIG. 5A) towards the disk 12. In order to compensate for this vertical displacement, the energy delivered to microactuator 140a may be reduced. By reducing the energy delivered to the microactuator 140a, the thermal expansion of the slider 20 will decrease, and the desired gap distance between the bottom slider 20 and the disk 12 may be maintained. Thus, in various embodiments, the simultaneous activation and deactivation of various microactuators 140a, 140b, 140c are used to maintain proper dynamic flying height of the magnetic head element 16.

Figure 8A:
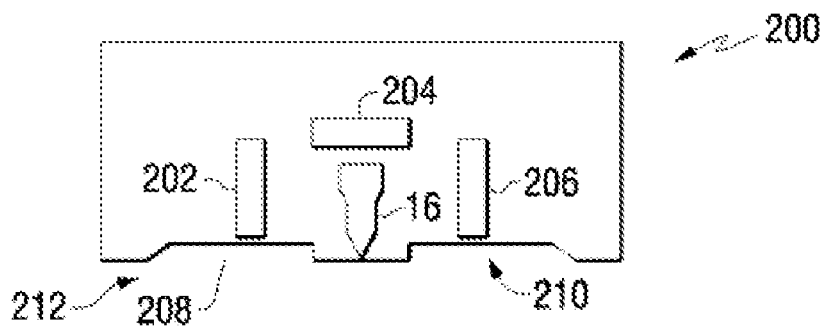
FIGS. 8A-8D illustrate orientations and configurations of various microactuators coupled to a slider according to various non-limiting embodiments.

FIGS. 8A-8D illustrate orientations and configurations of microactuators sliders according to various embodiments. The microactuators used with the slider are not limited to any particular size or shape. In FIG. 8A, for example, a slider 200, has a plurality of elongate microactuators 202, 204, 206 positioned proximate to the magnetic head element 16. Furthermore, as illustrated, the bottom surface 212 of the slider 200 (i.e., the air bearing surface) may define a first and second recess 208, 210. The recesses 208, 210 may be configured to limit or reduce the effects of the activation of the microactuator 202, 206 on the air bearing formed between the bottom surface 212 and the disk 12 (not shown) during rotation.

Figure 8B:
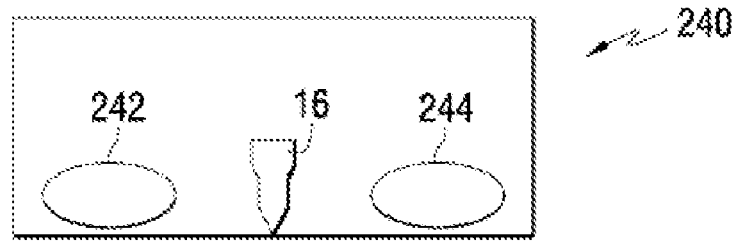

FIG. 8B illustrates an example embodiment of a slider 240 comprising two microactuators 242, 244 generally flanking the magnetic head element 16. The simultaneous activation of both microactuators 242, 244 translates the magnetic head element 16 vertically through thermal expansion of the slider 240. The application of an asymmetric thermal distribution to the slider 240 about the magnetic head element 16 creates a thermal gradient to laterally translate the magnetic head element 16 in the horizontal direction. Thus, through the use of the two microactuators 242, 244 the magnetic head element 16 may be moved in both a vertical direction and a lateral direction.

Figure 8C:
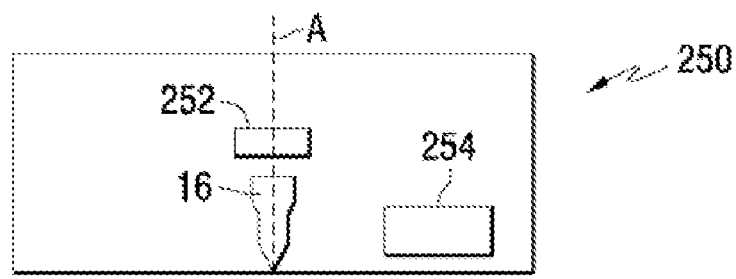

FIG. 8C illustrates an example embodiment of a slider 250 comprising a microactuator 252 positioned in a vertical relationship to the magnetic head element 16 and a single microactuator 254 positioned in a lateral relationship to the magnetic head element 16. The microactuator 252 may activated to control the vertical movement of the magnetic head element 16 and the microactuator 254 may be activated to control the horizontal movement of the magnetic head element 16. For example, when the microactuator 254 is in a non-activated state, the magnetic head element 16 may be located in first position lateral to a centerline (illustrated as "A") of the slider 250, offset toward to the microactuator 254. Activation of the microactuator 254 at a first activation level laterally moves the magnetic head element 16 to align with the centerline A, and activation of the microactuator 254 at a second activation level, which is higher than the first activation level, laterally moves the magnetic head element 16 to a second position lateral to the centerline A, offset away from the microactuator 254. Therefore, in various embodiments, the horizontal (i.e., lateral) translation of the magnetic head element 16 may be controlled with a single microactuator 254 laterally flanking the magnetic head element 16.

Figure 8D:
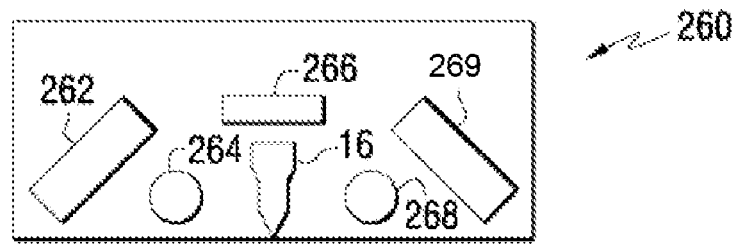

In FIG. 8D, a slider 260 comprises microactuators 262, 264, 266, 268, 269 positioned proximate to the magnetic head element 16. As illustrated, the magnetic head element 16 is laterally flanked by a plurality of microactuators on each side. The microactuators 262, 264, 266, 268, 269 may be each be calibrated to impart a specific amount of movement to the magnetic head element 16 at specific levels of activation. For example, the microactuators 262, 269 may be relatively large to impart a relatively large amount of movement onto the magnetic head element 16. The microactuators 264, 268 may be relatively smaller to impart a smaller amount of movement onto the magnetic head element 16. While the smaller microactuators 264, 268 may only impart a relatively small amount of movement to the magnetic head element 16, due to their small size, they will also dissipate heat quicker than the larger microactuators 262, 269 after activation. Thus, as is to be appreciated, various characteristics (i.e., thermal time constants) of the microactuators may be taken into consideration when determining the configuration and orientation of the microactuators for any particular embodiment.

Figure 9A:
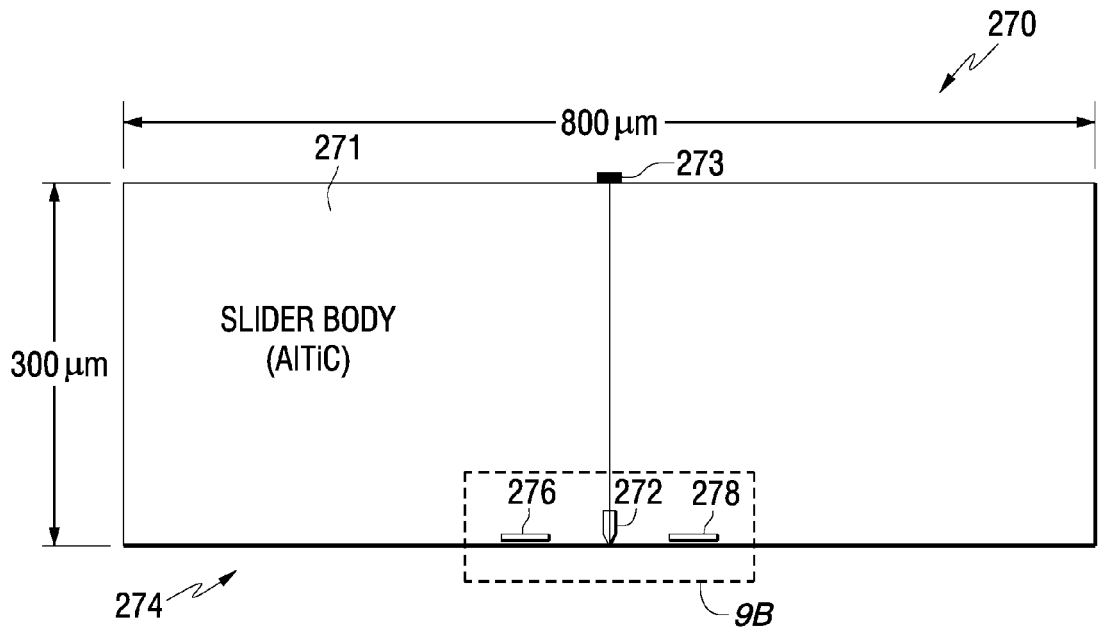
FIGS. 9A-9B illustrate a configuration of a slider in accordance with one non-limiting embodiment, with FIG. 9B providing an enlarged view of portion 9B of FIG. 9A.
Figure 9B:
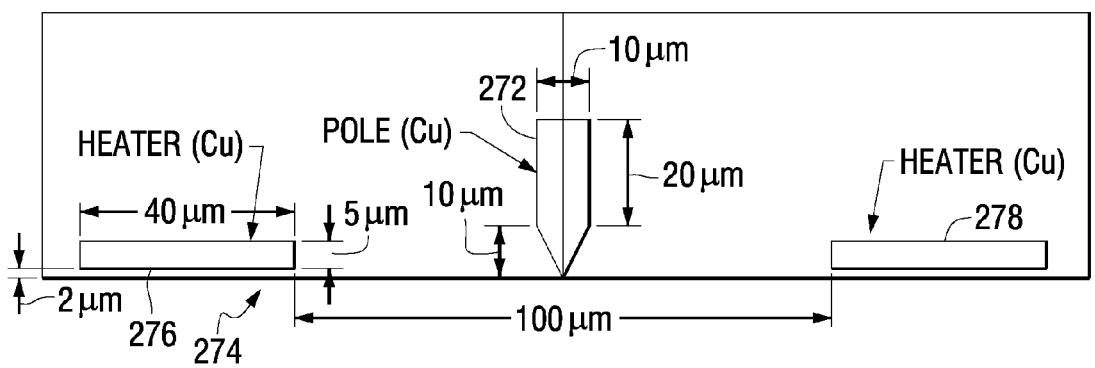

FIGS. 9A-9B illustrate a configuration of a slider 270 in accordance with one non-limiting embodiment, with FIG. 9B providing an enlarged view of portion 9B of FIG. 9A. The slider 270 comprises body 271 made of aluminum-titanium-carbon, although other suitable materials may be used. The slider 270 is about 800 μm in width and about 300 μm in height. The slider 270 may be attached to head gimbal assembly (not shown) at connection 273. A magnetic head element 272 (i.e., a pole) is located proximate a bottom surface 274 of the slider 270. The bottom surface 274 creates an air bearing surface during operation. The magnetic head element 272 is about 10 μm in width and about 30 μm in height in the illustrated example. A first heater 276 is disposed laterally from the magnetic head element 272 in a first lateral direction and a second heater 278 is disposed laterally from the magnetic head element 272 in a second lateral direction. The heaters 276, 278 are about 40 μm in width and 5 μm in height. In the illustrated embodiment, the magnetic head element 272, the first heater 276, and the second heater 278 are comprised of copper. Each heater 276, 278 is vertically positioned about 2 μm from the bottom surface 274 of the slider 270. During operation, the air flowing past the bottom surface 274 helps to quickly dissipate the heat from the heaters 276, 278. The first heater 276 is positioned about 100 μm from the second heater 278. FIGS. 9A-9B, however, is merely representative of one embodiment of the slider 270. As is to be appreciated, the embodiments disclosed herein are not limited to the arrangements, proportions, spacing, and/or configuration illustrated in FIGS. 9A-9B. The dimensions provided in FIGS. 9A-9B are merely illustrative and not intended to be limiting.

FIGS. 10A-10C, 11A-11C, 12A-12C, and 13A-13C provide Finite Element Analysis (FEA) simulations representing the operation of the slider 270 in various scenarios. The FEA simulation was performed with a 2-D representation of the slider 270. The mechanical boundary conditions were free except for at connection 273 and the thermal boundary conditions were room temperature on all surfaces.

FIGS. 10A-10C each illustrate successive close-ups of the lateral mechanical displacements in the slider 270 when the first heater 276 and/or the second heater 278 are activated. In FIG. 10A the second heater 278 is activated at 100 mW/μm producing a peak temperature around 250° C. In FIG. 10B both heaters 276, 278 are activated at 50 mW/μm and the peak temperature drops to around 100° C. In FIG. 10C the first heater 276 is activated at 100 mW/μm producing a peak temperature around 250° C. The contour lines 280 in FIGS. 10A-10C indicate positions of points within the slider relative to their positions when both heaters 276, 278 are turned off, in increments of 10 nm. The contour line 282 indicates the points on the slider 270 that have zero relative x-displacement (i.e. lateral displacement) compared to when the heaters 276, 278 are in a non-activated state. As illustrated, the contour line 282 terminates at the connection 273 since the connection 273 is simulated as a fixed point. In FIG. 10A, the lateral displacement of the magnetic head element 272 is about 35 nm in a first lateral direction 284 away from an air bearing surface centerline 288. In FIG. 10B, due to the power balance between the heaters 276, 278, there is no lateral movement of the magnetic head element 272. In FIG. 10C, the lateral displacement of the magnetic head element 272 is about 35 nm in a second lateral direction 286 away from an air bearing surface centerline 288.

Figures 11A, 11B, 11C:
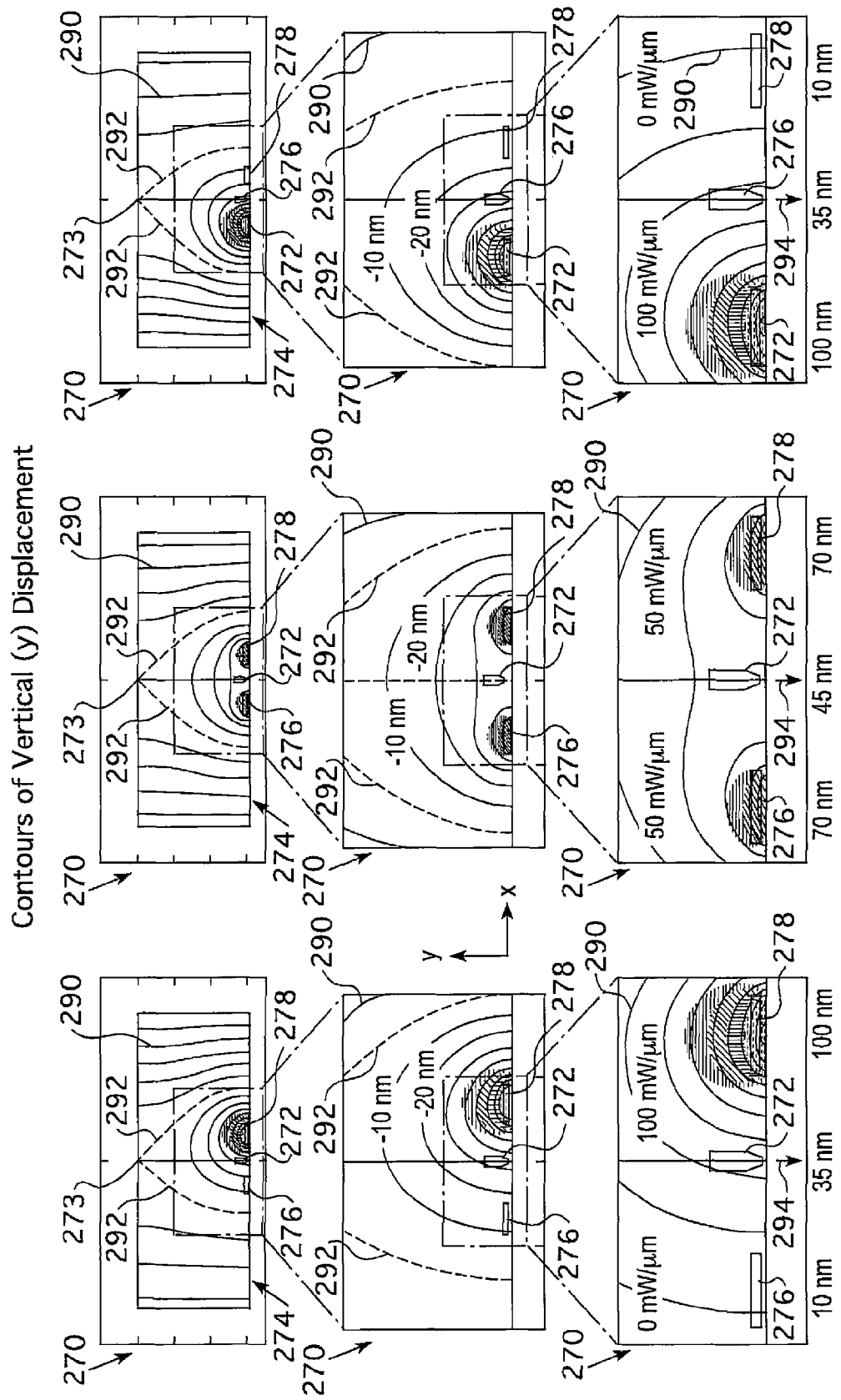
FIGS. 11A-11C are each successive close-ups of the vertical mechanical displacements in a two-dimensional simulated slider using FEA when a first lateral heater and/or the second lateral heater are activated.

FIGS. 11A-11C each illustrate successive close-ups of the vertical mechanical displacements in the slider 270 when the first heater 276 and/or the second heater 278 are activated. In FIG. 11A the second heater 278 is activated at 100 mW/μm producing a peak temperature around 250° C. In FIG. 11B both heaters 276, 278 are activated at 50 mW/μm and the peak temperature drops to around 100° C. In FIG. 11C the first heater 276 is activated at 100 mW/μm producing a peak temperature around 250° C. The contour lines 290 in FIGS. 11A-11C indicate positions of points within the slider relative to their positions when both heaters 276, 278 are turned off, in increments of 10 nm. The contour line 292 indicates the points within the slider 270 that have zero relative y-displacement (i.e. vertical displacement) compared to when the heaters 276, 278 are in a non-activated state. As illustrated, the contour lines 292 terminate at the connection 273 since the connection 273 is simulated as a fixed point.

In FIG. 11A, the vertical displacement of the magnetic head element 272 is about 35 nm in a first vertical direction 294. The vertical displacement of the slider 270 proximate to the second heater 278 in the first vertical direction 294 is about 100 nm. The thermal expansion induced by the second heater 278 also vertically displaces the slider 270 proximate to the first heater 276 by about 10 nm in the first vertical direction 294. Accordingly, similar to the embodiment illustrated in FIG. 8A, the slider 270 may comprise a recess proximate to the heaters 276, 278 to avoid undesirable protrusions to the bottom surface 274 (e.g., the air bearing surface) during activation. In FIG. 11B, the vertical displacement of the magnetic head element 272 is about 45 nm in the first vertical direction 294. As illustrated, the vertical displacement of the slider 270 proximate the heaters 276, 278 is about 70 nm in the first vertical direction 294. In FIG. 11C, the vertical displacement of the magnetic head element 272 is about 35 nm in the first vertical direction 294. The vertical displacement of the slider 270 proximate to the first heater 276 is about 100 nm in the first vertical direction 294. The thermal expansion induced by the first heater 276 vertically displaces the slider 270 proximate to the second heater 278 by about 10 nm in the first vertical direction 294.

Figures 12A, 12B, 12C:
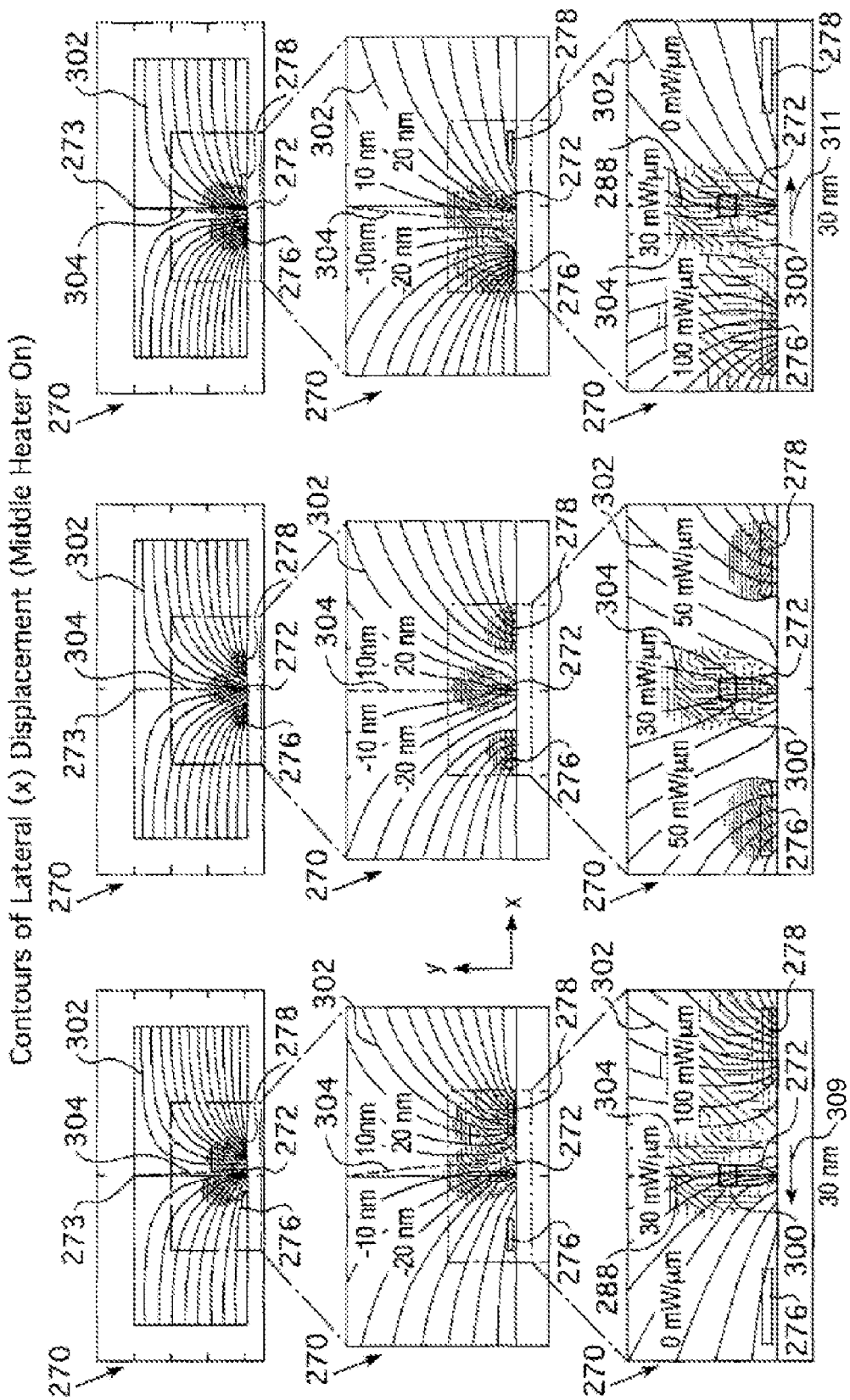
FIGS. 12A-12C are each successive close-ups of the lateral mechanical displacements in a two-dimensional simulated slider using FEA when a central heater, a first lateral heater and/or a second lateral heater are activated.

FIGS. 12A-12C each illustrate successive close-ups of the lateral mechanical displacements in the slider 270 when a central heater 300, the first heater 276 and/or the second heater 278 are activated. In FIG. 12A the second heater 278 is activated at 100 mW/μm and the central heater 300 is activated at 30 mW/μm, producing a peak temperature of about 250° C. In FIG. 12B both heaters 276, 278 are activated at 50 mW/μm and the central heater is activated at 30 mW/μm. In FIG. 12C the first heater 276 is activated at 100 mW/μm and the central heater 300 is activated at 30 mW/μm, producing a peak temperature of about 250° C. The contour lines 302 in FIGS. 12A-12C indicate positions of points within the slider relative to their positions when all the heaters 276, 278, 300 are turned off, in increments of 10 nm. The contour line 304 indicates the points on the slider 270 that have zero relative x-displacement (i.e. lateral displacement) compared to when the heaters 276, 278, 300 are in a non-activated state. As illustrated, the contour lines 304 terminate at the connection 273 since the connection 273 is simulated as a fixed point.

In FIG. 12A, the lateral displacement of the magnetic head element 272 is about 30 nm in a first lateral direction 309 away from an air bearing surface centerline 288. In FIG. 12B, due to the power balance between the heaters 276, 278, there is no lateral movement of the magnetic head element 272. In FIG. 12C, the lateral displacement of the magnetic head element 272 is about 30 nm in a second lateral direction 311 away from an air bearing surface centerline 288.

FIGS. 13A-13C each illustrate successive close-ups of the vertical mechanical displacements in the slider 270 when the central heater 300, the first heater 276 and/or the second heater 278 are activated. In FIG. 13A the second heater 278 is activated at 100 mW/μm and the central heater 300 is activated at 30 mW/μm producing a peak temperature around 250° C. In FIG. 13B the heaters 276, 278, 300 are activated at 50 mW/μm and the central heater 300 is activated at 30 mW/μm. In FIG. 13C the first heater 276 is activated at 100 mW/μm producing a peak temperature and the central heater 300 is activated at 30 mW/μm around 250° C. The contour lines 310 in FIGS. 13A-13C indicate positions of points within the slider relative to their positions when all the heaters 276, 278, 300 are turned off, in increments of 10 nm. The contour lines 312 indicates the points on the slider 270 that have zero relative y-displacement (i.e. vertical displacement) compared to when the heaters 276, 278, 300 are in a non-activated state. As illustrated, the contour lines 312 terminate at the connection 273 since the connection 273 is simulated as a fixed point.

In FIG. 13A, the vertical displacement of the magnetic head element 272 is about 130 nm in a first vertical direction 314. The vertical displacement of the slider 270 proximate to the second heater 278 is about 130 nm in the first vertical direction 314. The thermal expansion induced by the second heater 278 also vertically displaces the slider 270 proximate to the first heater 276 by about 50 nm in the first vertical direction 314. In FIG. 13B, the vertical displacement of the magnetic head element 272 is about 130 nm in the first vertical direction 314. As illustrated, the vertical displacement of the slider 270 proximate the heaters 276, 278 is about 100 nm. In FIG. 13C, the vertical displacement of the magnetic head element 272 is about 130 nm in the first vertical direction 314. The vertical displacement of the slider 270 proximate to the first heater 276 is about 130 nm in the first vertical direction 314. The thermal expansion induced by the first heater 276 vertically displaces the slider 270 proximate to the second heater 278 by about 50 nm in the first vertical direction 314.

Figure 14:
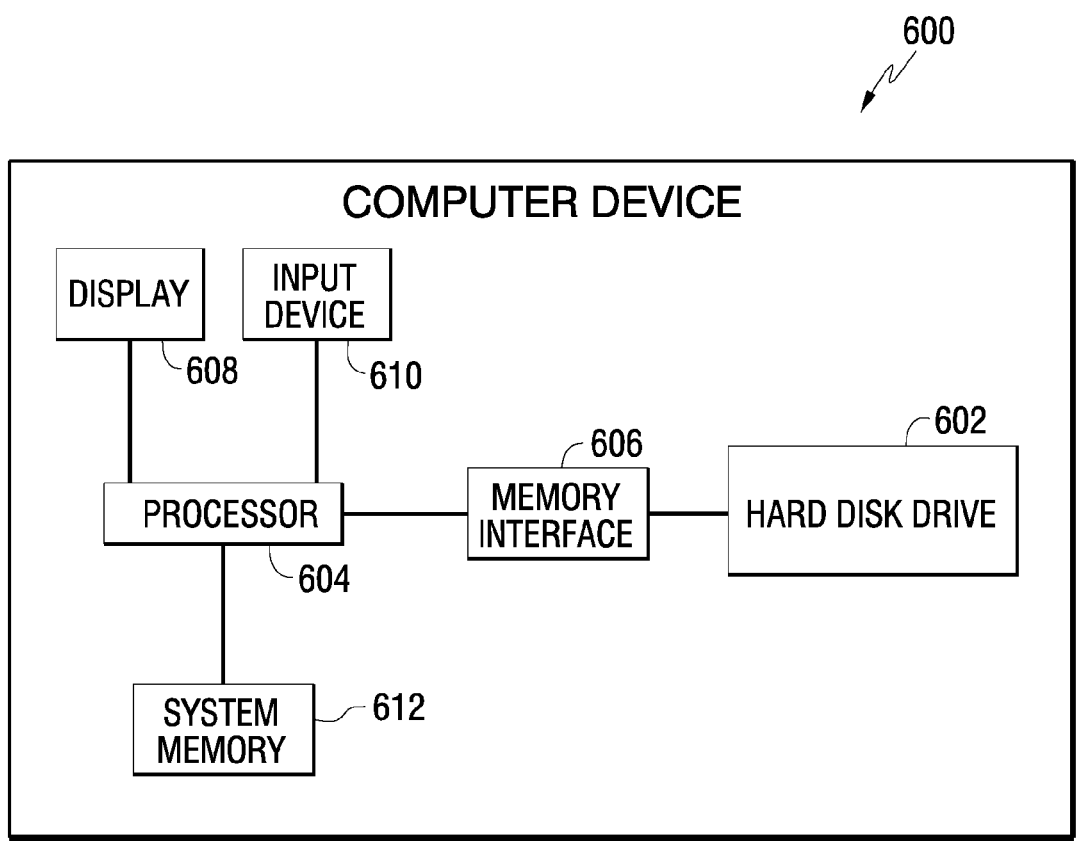
FIG. 14 is a computer device comprising a hard disk drive in accordance with various non-limiting embodiments.

FIG. 14 is a computer device 600 comprising a hard disk drive 602 in accordance with various non-limiting embodiments. In one embodiment, the computer device 600 is a personal computer. The computer device 600, however, may be any electronic device in communication with a hard disk drive, such as a laptop computer, a desktop computer, an application server, a network server, or any other computer device having a hard disk drive. In accordance with previously discussed embodiments, the hard disk drive 602 comprises at least one magnetic head element and at least one microactuator for selectively translating the magnetic read head in a horizontal direction. The computer device 600 may also comprise a central processor 604 in communication with various components and peripherals of the computer device 600. For example, the processor 604 may be in communication with a memory interface 606, a display 608, and an input device 610. The display 608 may be, for example, an LCD display or a CRT display. The input device 610 may be any suitable device(s), such as a keyboard, a mouse, a touch screen, or a track ball, for example. The computer device 600 may also comprise a system memory 612 in communication with the processor 604. Software with instructions for execution by the processor 604 may be stored on the system memory 612. The processor 604 may execute the software to perform various functions, such as retrieve data from the hard disk drive 602. The computer device 600 may comprise one or more processors 604, one or more system memories 612, and one or more hard disk drives 602. For convenience, only one processor 604, only one system memory 612, and one hard disk drive 602 are shown in FIG. 14. The hard disk drive 602 may be internal or external, and may be a local device or a networked device. The processor 604 may be implemented as an integrated circuit (IC) having one or multiple cores. The system memory 612 may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. The RAM and/or ROM memory units may be implemented as discrete memory ICs, for example.

Figure 15:
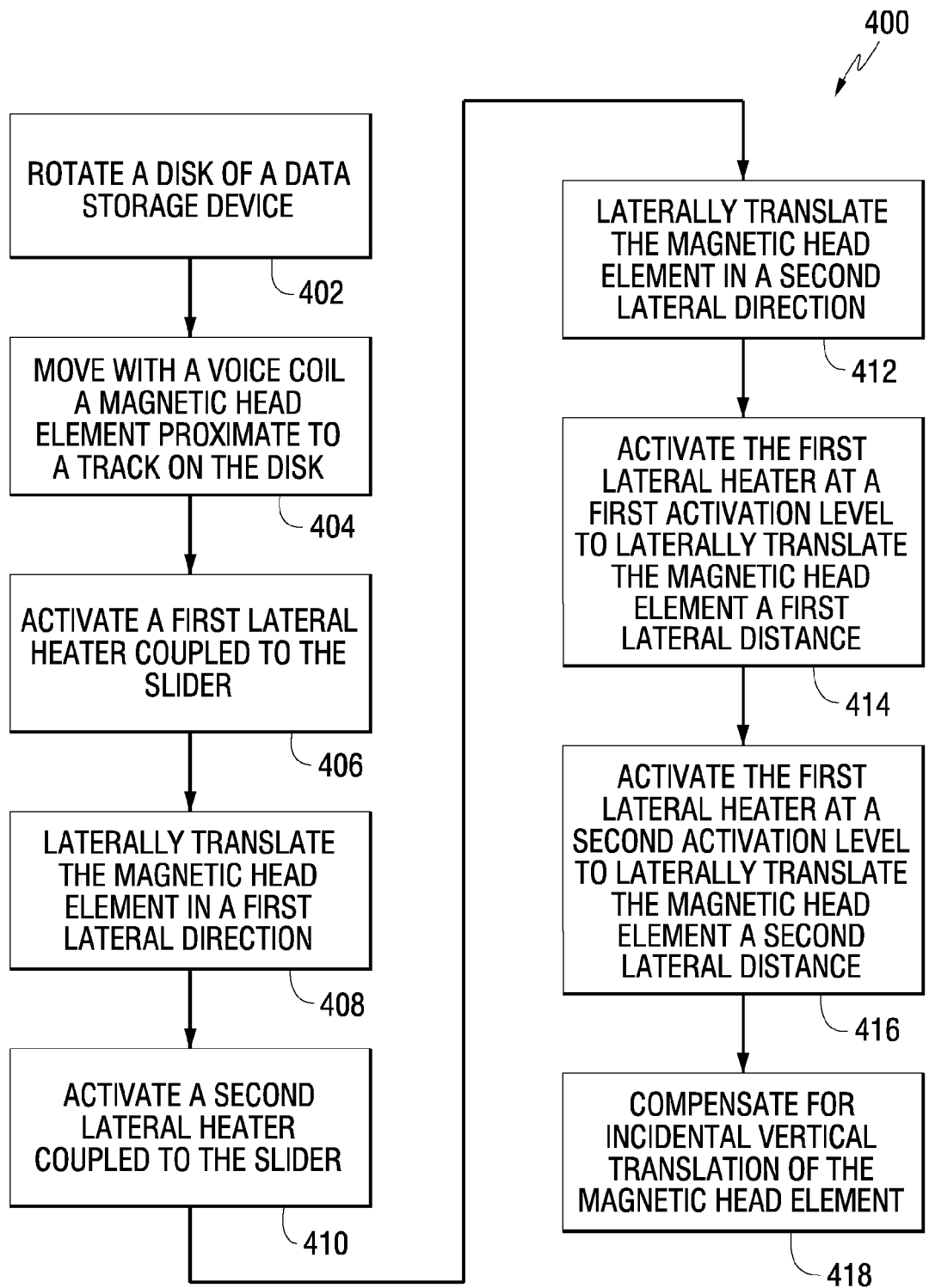
FIG. 15 is a flow chart of the operation of a data storage device in accordance with one non-limiting embodiment.

FIG. 15 is a flow chart 400 of the operation of a data storage device in accordance with one non-limiting embodiment. At 402, a disk of a data storage device is rotated by a spindle motor. At 404, a magnetic head element is moved proximate to a track on the disk with a voice coil. In one embodiment, the magnetic head element is moved with the voice coil during a "track seek" operation. At 406, a first lateral heater coupled to the slider is activated. At 408, the magnetic head element is laterally translated in a first lateral direction. In one embodiment, the first lateral heater is activated with electrical current supplied to the first lateral heater via a circuit. At 410, a second lateral heater coupled to the slider is activated. At 412, the magnetic head element is laterally translated in a second lateral direction. The second lateral direction is generally opposite to the first lateral direction. In one embodiment, the second lateral heater is activated with electrical current supplied to the second lateral heater via a circuit. At 414, the first lateral heater is activated at a first activation level to laterally translate the magnetic head element a first lateral distance. At 416, the first lateral heater is activated at a second activation level to laterally translate the magnetic head element a second lateral distance. Accordingly, depending on how far the magnetic head element needs to be laterally translated in order to follow the track, the first and/or second lateral heaters may be activated at varying levels. At 418, incidental vertical translation of the magnetic head element may be compensated for by deactivation of a third heater that is positioned vertical to the magnetic head element. Deactivation of the third heater may comprise decreasing the amount of energy delivered to the third heater.

In accordance with various embodiments, sliders incorporating the microactuators for lateral magnetic head element translation may be fabricated using techniques and processes similar to those for fabricating sliders incorporating dynamic fly height control functionality. For example, in one embodiment, during the slider fabrication process, when a microactuator is deposited on the slider positioned above the magnetic head element for fly height control functionality, additional microactuators may be deposited at positions lateral to the magnetic head element.

According to various embodiments, a disk drive is disclosed comprising a slider comprising a vertical axis and a horizontal axis, where the slider comprises a magnetic head element; a first microactuator; and a second microactuator. The first microactuator is positioned relative to the magnetic head element such that the magnetic head element is translated generally along the horizontal axis in a first direction when the first microactuator is activated. In one embodiment, the magnetic head element is configured to translate generally along the vertical axis when the second microactuator is activated. In one embodiment, the disk drive further comprises a third microactuator positioned relative to the magnetic head element such that the magnetic head element is translated generally along the horizontal axis in a second direction when the third microactuator is activated. In one embodiment, the activation level of the second microactuator is adjustable to compensate for a vertical translation of the magnetic head element imparted by activation of the first microactuator. In one embodiment, the second microactuator is configured to at least partially deactivate to compensate for the vertical translation of the magnetic head element imparted by activation of the first microactuator. In one embodiment, the third microactuator laterally expands a portion of the slider in the second direction during activation. In one embodiment, the first microactuator laterally expands a portion of the slider in the first direction during activation. In one embodiment, the first and second microactuators are electrothermal microactuators.

According to various embodiments, a disk drive is disclosed, comprising a slider comprising a magnetic head element and a first heater disposed laterally from the magnetic head element. Activation of the first heater moves the magnetic head element in a first lateral direction and deactivation of the first heater moves the magnetic head element in a second lateral direction. In one embodiment, the first lateral direction comprises a first cross-track direction component and one of an up-track direction component and a down-track direction component, and wherein the second lateral direction comprises a second cross-track direction component and one of an up-track direction component and a down-track direction component. In one embodiment, the disk drive comprises a control circuit configured to control (e.g., activate and deactivate) the first heater, where the control circuit is in electrical communication with the first heater. In one embodiment, the disk drive further comprises a second heater disposed laterally from the magnetic head element head. Activation of the second heater moves the magnetic head element in the second lateral direction and deactivation of the second heater moves the magnetic head element in the first lateral direction. In one embodiment, the disk drive comprises a third heater disposed vertically from the magnetic head element head. Activation of the third heater moves the magnetic head element in a first vertical direction and deactivation of the third heater moves the magnetic head element in a second vertical direction. In one embodiment, the third heater is configured to compensate for vertical movement of the magnetic head element imparted by at least one of the first and second heaters.

According to various embodiments, a disk drive is disclosed comprising a slider comprising a magnetic head element head and a plurality of heaters. The plurality of heaters are configured to produce an asymmetric thermal distribution about the vertical axis of the slider. In one embodiment, the asymmetric thermal distribution is configured to translate the read/write head generally normal to the vertical axis. In one embodiment, the plurality of heaters comprises a first lateral heater and a second lateral heater. In one embodiment, the disk drive further comprises a central heater positioned generally on the vertical axis. In one embodiment, the disk drive further comprises a controller in electrical communication with the plurality of heaters configured to selectively control each of the plurality of heaters.

According to various embodiments, a computer device is disclosed comprising a processor and a hard disk drive in communication with the processor. The hard disk drive comprises a slider that comprises a magnetic head element, at least one microactuator, and a circuit connected to the at least one heater for controlling the at least one microactuator. The at least one heater is positioned relative to the magnetic head element such that the magnetic head element is translated generally along the horizontal axis when the at least one microactuator is supplied with electrical current via the circuit. In one embodiment, the at least one microactuator is a heater. In one embodiment, the at least one microactuator is configured to expand a portion of the slider when supplied with electrical current via the circuit.

According to various embodiments, a method is disclosed comprising the steps of rotating a disk of a data storage device; moving with a voice coil a magnetic head element proximate to a track on the disk; laterally translating the magnetic head element in a first lateral direction by activating a first lateral heater coupled to the slider; and laterally translating the magnetic head element in a second lateral direction by activating a second lateral heater coupled to the slider. In one embodiment, the method comprises activating a the first lateral heater at a first activation level to laterally translate the magnetic head element a first lateral distance, and activating a the first lateral heater at a second activation level to laterally translate the magnetic head element a second lateral distance. In one embodiment, the method comprises compensating for the vertical displacement of the slider imparted by at least one of the first lateral heater and the second lateral heater. In one embodiment, the method comprises activating a central heater to vertically translate the magnetic head element a first vertical distance and deactivating the central heater to compensate for the vertical displacement of the slider imparted by at least one of the first lateral heater and the second lateral heater.

Although the present invention has been described herein with respect to certain embodiments, those of ordinary skill in the art will recognize that many modifications and variations of the present invention may be implemented. For example, different materials may be used than those specified previously. In addition, different processing techniques may be used to fabricate portions of the slider 20. The foregoing description and the following claims are intended to cover all such modifications and variations.

What is claimed is:

1. A disk drive, comprising:
  a slider comprising a vertical axis and a horizontal axis, wherein the slider comprises:
    a slider body;
    a magnetic head element in the slider body;
    a first microthermal actuator in the slider body; and
    a second microthermal actuator in the slider body,
    wherein the first microthermal actuator is positioned relative to the magnetic head element such that the magnetic head element is translated generally along the horizontal axis in a first direction by expansion of the slider body proximate the first microthermal actuator due to heat from the first microthermal actuator when the first microthermal actuator is activated; and
  a controller connected to the first and second microthermal actuators for individually controlling the first and second microthermal actuators, wherein the controller is for controlling the first microthermal actuator to adjust a cross-track position of the magnetic head element based on a detected cross-track position of the magnetic head element.

2. The disk drive of claim 1, wherein the second microthermal actuator is positioned relative to the magnetic head element such that the magnetic head element is translated generally along the vertical axis by expansion of the slider body proximate the second microthermal actuator when the second microthermal actuator is activated by the controller.

3. The disk drive of claim 2, wherein the activation level of the second microthermal actuator is adjustable by the controller to compensate for a vertical translation of the magnetic head element imparted by activation of the first microthermal actuator.

4. The disk drive of claim 3, wherein the second microthermal actuator is configured to at least partially deactivate by the controller to compensate for the vertical translation of the magnetic head element imparted by activation of the first microthermal actuator.

5. The disk drive of claim 2, further comprising:
a third microthermal actuator connected to the controller and positioned relative to the magnetic head element such that the magnetic head element is translated generally along the horizontal axis in a second direction by expansion of the slider body proximate the third microthermal actuator when the third microthermal actuator is activated by the controller.

6. A computer device, comprising:
a processor; and
a hard disk drive in communication with the processor, the hard disk drive comprising:
   a slider comprising;
      a slider body having a horizontal axis and a vertical axis;
      a magnetic head element in the slider body;
      at least one microthermal actuator in the slider body;
      wherein the at least one microthermal actuator is positioned relative to the magnetic head element such that the magnetic head element is translated generally along the horizontal axis by expansion of the slider body proximate the at least one microthermal actuator due to heat from the at least one microthermal actuator when the at least one microthermal actuator is activated supplied with electrical current via the circuit; and
      a controller connected to the at least one microthermal actuator for controlling the at least one microthermal actuator, wherein the controller is for controlling the at least one microthermal actuator to adjust a cross-track position of the magnetic head element based on a detected cross-track position of the magnetic head element.

7. A method, comprising:
rotating a disk of a data storage device;
moving with a voice coil a slider comprising a magnetic head element proximate to a track on the disk;
laterally translating the magnetic head element in a first lateral direction relative to the track by activating a first lateral heater coupled to the slider;
laterally translating the magnetic head element in a second lateral direction relative to the track by activating a second lateral heater coupled to the slider;
compensating for vertical displacement of the slider imparted by at least one of the first lateral heater and the second lateral heater;
activating a central heater to vertically translate the magnetic head element a first vertical distance; and
deactivating the central heater to compensate for the vertical displacement of the slider imparted by at least one of the first lateral heater and the second lateral heater.

8. The method of claim 7, further comprising:
activating the first lateral heater at a first activation level to laterally translate the magnetic head element a first lateral distance; and
activating the first lateral heater at a second activation level to laterally translate the magnetic head element a second lateral distance.

\* \* \* \* \*

UNITED STATES PATENT AND TRADEMARK OFFICE
CERTIFICATE OF CORRECTION

| | | |
|---|---|---|
| PATENT NO. | : 8,289,659 B1 | |
| APPLICATION NO. | : 12/718674 | |
| DATED | : October 16, 2012 | |
| INVENTOR(S) | : James A. Bain and William C. Messner | |

It is certified that error appears in the above-identified patent and that said Letters Patent is hereby corrected as shown below:

On the Title Page, Item (*) Notice, delete "This patent is subject to a terminal disclaimer."

Signed and Sealed this
Fourth Day of December, 2012

David J. Kappos
*Director of the United States Patent and Trademark Office*